April 19, 1938.   K. W. MESTERTON   2,114,427
VEGETABLE CUTTER AND SLICER
Filed April 28, 1936   2 Sheets-Sheet 1
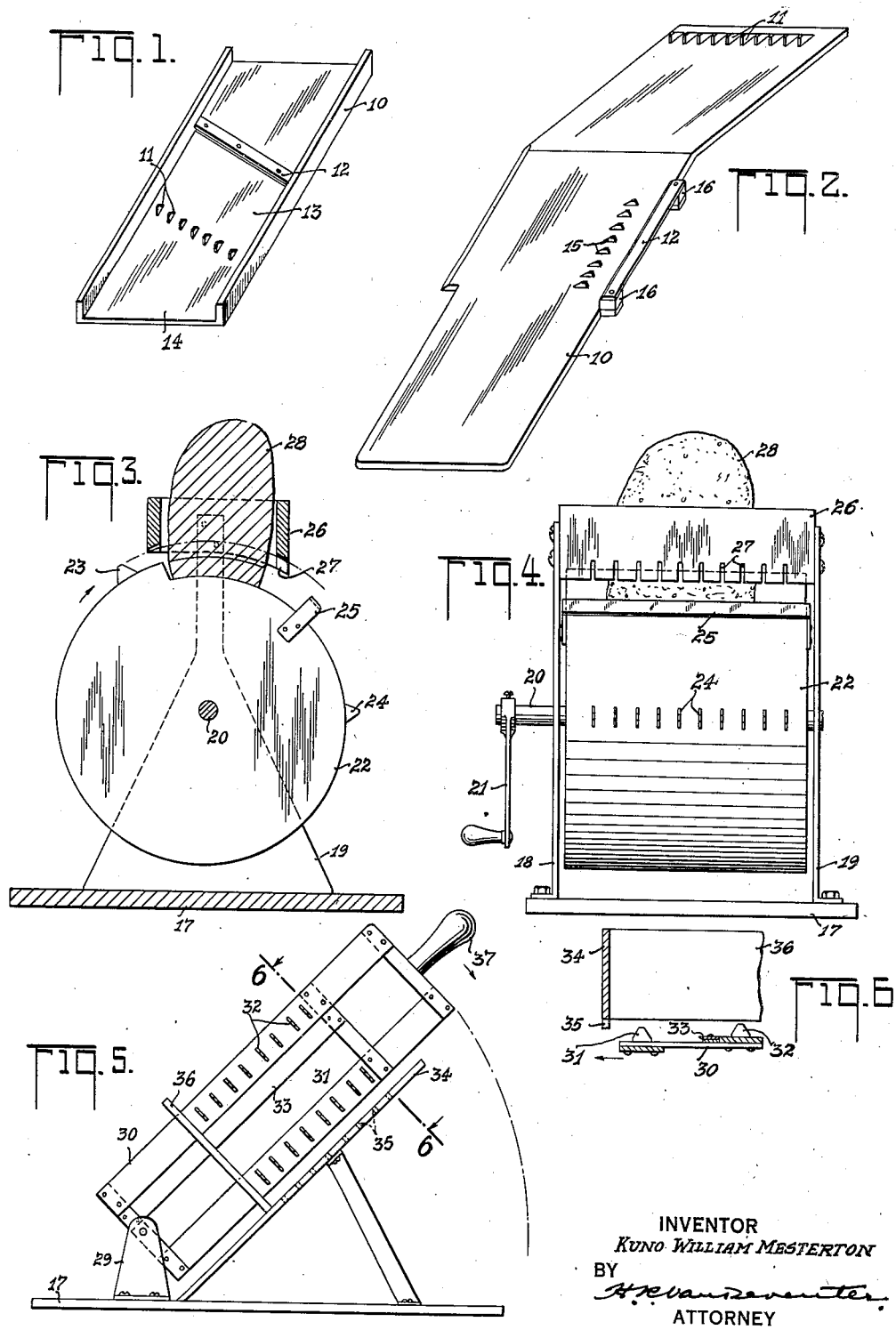
INVENTOR
KUNO WILLIAM MESTERTON
BY
ATTORNEY

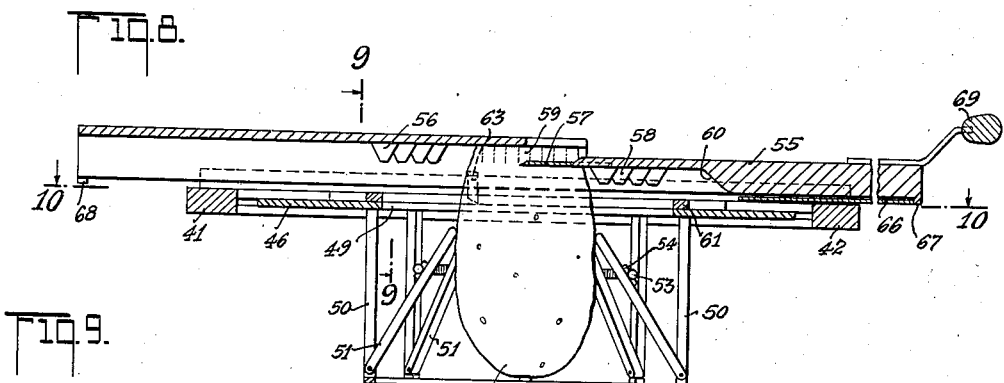
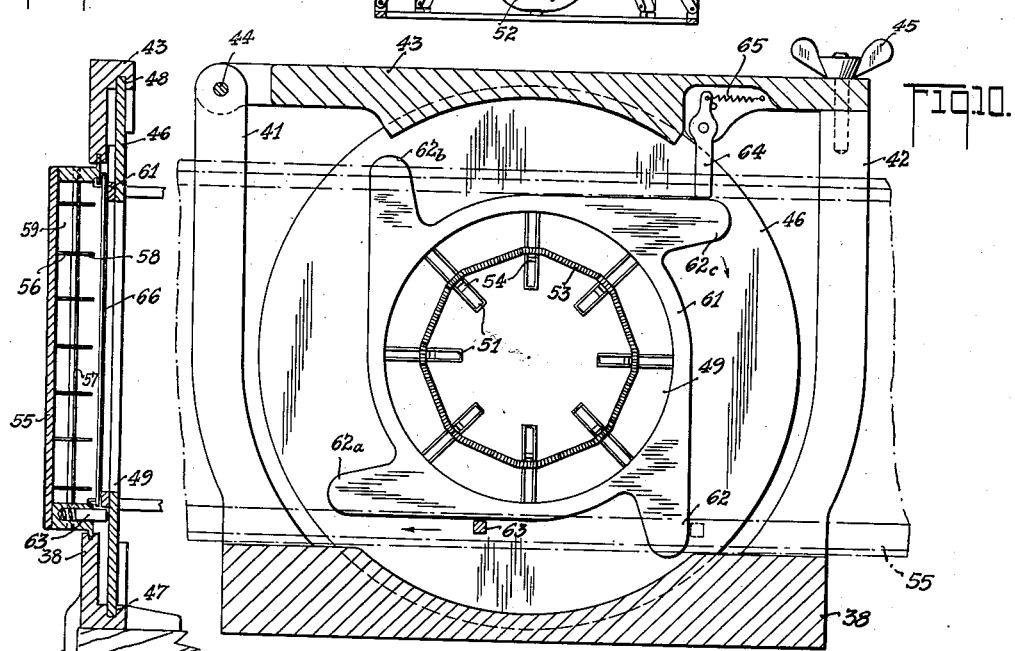
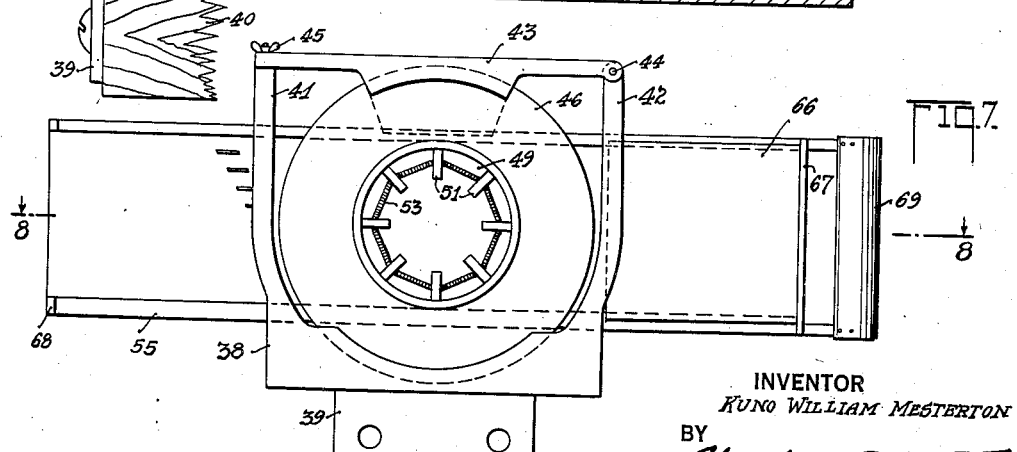

Patented Apr. 19, 1938

2,114,427

UNITED STATES PATENT OFFICE 2,114,427

VEGETABLE CUTTER AND SLICER

Kuno W. Mesterton, Brooklyn, N. Y.

Application April 28, 1936, Serial No. 76,722

10 Claims. (Cl. 146—78)

This invention relates to improvements in vegetable cutters and slicers.

An object of the invention is to produce a vegetable device of substantial and simple construction for home, restaurant and hotel use.

More specifically, the invention relates particularly to a device for producing cubed vegetables, and a further object is to produce a device particularly suited to making so-called "potato dice," although it will be understood that the device is not limited to the production of dice, as will more fully hereinafter appear.

The invention consists substantially in the construction, combination, location and relative arrangement of parts, all as will be more fully hereinafter set forth and as shown by the accompanying drawings and finally pointed out in the appended claims.

For the sake of illustration, the device will be described in several preferred embodiments thereof as more fully shown in the accompanying drawings in which:

Figure 1 is a vegetable cutter suitable for plain slicing such as the making of Saratoga chips and the like or for making shoestring potatoes or for making potato dice or the like;

Figure 2 is a device similar to Figure 1 particularly applicable for making shoestring and diced potatoes;

Figure 3 is a side elevation, partly in section, of a rotary machine embodying the invention;

Figure 4 is an end view of the machine shown in Figure 3;

Figure 5 is a side elevation of a modified form of a device shown in Figures 3 and 4;

Figure 6 is a view on the line 6—6, Figure 5;

Figure 7 is a front elevation of a vegetable cutter embodying the invention and including automatic means for holding and turning the vegetable to be cut;

Figure 8 is a horizontal sectional view on the line 8—8 of Figure 7;

Figure 9 is a cross sectional view on the line 9—9, Figure 8; and

Figure 10 is a vertical sectional view on the line 10—10, Figure 8, with the cutting member removed.

In Figure 1, the numeral 10 denotes a rectangular supporting frame having a plurality of slotting knives 11 mounted transversely therein, said knives having their planes parallel to the longest dimension of the frame.

A cutting knife 12 is placed diagonally across the frame and has its cutting edge positioned above the upper points of the knives 11. A space 13 is provided between the slotting knives and the cutting knife, the distance between the knives being such that a vegetable such as a potato may be placed therein.

To use this device to produce, for example, Saratoga chips, the end of a potato is pressed downwardly in the space 13 and then the potato is moved toward the cutting knife 12 and is forced against the knife which cuts a slice from the main body of the potato. This operation is repeated thereby producing the ordinary potato chip.

If it is desired to produce shoestring potatoes, the end of the potato is first passed across the knives 11 and the motion is continued onwards across the space 13 until the potato is brought into engagement with the knife 12 which cuts off the slotted portion thereof which falls apart making the well-known shoestring potatoes.

If it is desired to dice the potato, the very end of the potato is started at the point 14, is moved across the slotting knives 11 to the space 13 which will slot the surface of the potato; it is then turned 90° and again passed across the knives 11 which produce a series of slots transverse to said first slots. The potato is then carried forward against the cutting-off knife 12 which cuts off the slotted portion of the potato which falls apart into dice.

Figure 2 shows a modification of the device, Figure 1, in which the supporting frame 10 carries a set of slotting knives 11 mounted transversely thereon and having their planes parallel with the longest dimension thereof, and a second set of slotting knives 15 is mounted on the frame having their cutting edges at right angles to the cutting edges of said first set of knives.

Cutting knife 12 is mounted at one edge of the frame and is elevated slightly above the surface thereof by any suitable means such as the blocks 16. Here the knives 11 may be used to give the first scoring to the vegetable which is then brought against the knives 15 if it is desired to produce dice, the latter knives making scores transverse to said first scores. The vegetable is then carried against the cutting knife 12 which cuts off the scored portion which falls apart, forming dice.

Figures 3 and 4 show a rotary form of device, which comprises a base 17 supporting two uprights 18, 19 in which is journaled a shaft 20 provided with a crank 21, said shaft having rigidly secured thereto a rotatable drum 22. The outer surface of said drum is spiral in form as shown in the side view, Figure 3, and at the highest point on said spiral is mounted a set of slotting knives 23. On a lower portion of said spiral nearer the shaft 20 is mounted a second set of slotting knives 24 and between the sets of knives 23 and 24 is mounted a cutting knife 25. A hopper 26 is suitably mounted between the uprights 18 and 19 and is slotted as shown at 27 to permit the passage of the slotting knives 23 therethrough.

If a vegetable such as a potato 28 is placed in the hopper and pressed downward and crank 21 is revolved in the direction of the arrow, Figure 3, the lower surface of the potato will first be slotted by the knives 23 and as the drum continues to revolve, the surface of the potato will ride on the spiral surface of the drum, the potato meanwhile having been turned through an angle of 90°. As the drum continues to revolve the knives 24 will slot the potato at right angles to the slots that were produced by the knives 23, and after said slotting process is completed, the cutting off knife 25 will encounter the potato and cut off slotted portion thereof from the main body of the potato and the slotted portion will fall apart into dice. Just by continually rotating the drum and turning the potato 28 each time knives 23 have passed through the lower end of same, a continuous production of potato dice is obtained.

Figures 5 and 6 show another modification of the device in which a base 17 supports an upwardly projecting support 29 to which is pivotally secured a frame 30. This frame carries two sets of slotting knives, each set being indicated by the numeral 31, 32. The cutting knife 33 is also mounted on this frame as shown in the figures. A support 34 is mounted on the frame as shown in Figure 5 and is provided with a plurality of slots 35 to permit the passage of the knives 32 therethrough.

In operation the vegetable, for example a potato, has a flat surface thereon, which flat surface is brought up against the frame 30, the potato being rested on the support 36 secured to 34. A full stroke downwards on the handle 37 in the direction of the arrow, Figure 5, will leave the end of the potato towards the frame 30 scored by the action of knives 32. The handle is then raised, the potato turned through an angle of 90°, the handle is again brought downwards, the knives 31 will score the potato across the first scoring and as the downward stroke continues the cutting knife 33 will cut off the scored end of the potato, the cut off portions separating into dice; and as the stroke further continues knives 32 will again score the exposed end of the potato and this process may be repeated until the potato is completely diced.

Referring the Figure 7, the numeral 38 indicates a supporting frame having a downwardly extending lug 39 for use in securing the device to the edge of a table 40 as shown in Figure 9. The frame 38 is substantially U-shaped, having uprights 41 and 42. A cross member 43 is hinged at one end 44 to the upright 41 and is adapted to be clamped at its other end to the upright 42 by means of a wing nut 45.

A circular holder plate 46 is rotatably mounted in grooves 47 and 48 of the frame 38 and cross member 43 respectively and has a circular central opening 49. Secured to the front of the plate 46 around the opening 49 is a row of circumferentially spaced posts 50 having hinged to their outer ends inwardly directed levers 51 adapted to guide a vegetable such as a potato 52 Figure 8 into the center of the opening. A helical tension spring 53 engages notched blocks 54 on the outer sides of levers 51 and urges the latter inward, thus permitting the levers to adapt themselves to different sizes of vegetables and to irregularities in the shape thereof.

A carriage 55 is slidably guided in the frame 38 and cross member 43 behind the plate 46 and has secured thereto a forward row of slotting knives 56 of the type previously described, a central cutting knife 57 and a rear row of knives 58, the central knife 57 being disposed in line with the upper edge of front knives 56 while the rear knives 58 project above the plane of the cutting knife. An opening 59 is provided under the knife 57 for the discharge of cuttings. The carriage 55 has formed therein an incline 60 behind the rear knives 58 for a purpose hereinafter explained.

A ring 61 secured to the plate 46 between the latter and the carriage 55 has four tangentially extending lugs 62, 62a, 62b and 62c. The carriage 55 carries a spring-pressed plunger pawl 63 adapted to engage one of the tangential lugs such as 62, Figure 10, when the carriage is moved on its return stroke, that is to the left in Figure 10. A lever pawl 64 pivoted to the cross member 43 in line with lugs 62, etc., and urged clockwise by a spring 65, Figure 10, is adapted to restrict rotation of the ring 61 to the clockwise direction.

A thin plate 66, slidably guided in the carriage 55 between the face of the latter and the ring 61, is adapted to be engaged at its rear end by a step 67 on the rear end of the carriage and at its front end by a second step 68 on the front end of the carriage. If desired, guides for the plate 66 may be provided on the frame 38.

The operation of the automatic device is as follows:

The potato 52 is first pressed into the opening 49, preferably with the carriage 55 in mid position so that the rear knives 58 will first slit the potato as the carriage is moved forward. The spring pressed levers 51 guide the potato into the center of the opening 49. The forward stroke of the carriage, to the left in Figure 8, causes the rear knives 58 to slot the potato in one direction, after which the incline 60 pushes the potato outward and guides it over the plate 66 which latter is carried forward by the step 67. As the carriage completes its forward or cutting stroke the plate 66 closes the opening 49, holding the potato above the line of the knives.

As the carriage 55 is drawn backward on its return stroke, that is to the left in Figure 10, the plunger pawl 63 encounters the lug 62 and moves it to the left, thus revolving the plate 46 and with it the potato 52 through 90°. As the plate rotates the lever pawl 64 overrides the adjacent lug moving past it and as the quarter revolution is completed the lever 64 snaps behind the adjacent lug.

As the carriage approaches the rear end of its return stroke, the step 68 encounters the plate 66 and moves it rearwardly out of contact with the potato 52 to clear the opening 49. The operator then pushes the potato forward into contact with the carriage 55 ahead of the forward knives 56. The carriage 55 is then pushed forward on a cutting stroke, first causing the knives 56 to slot the potato at right angles to the slots previously made by the rear knives 58, next causing the cutting knife 57 to cut a layer of cubes from the potato as previously described, next reslotting the potato by means of the rear knives 58, finally pushing the potato outward and interposing the plate 66 between it and the plane of the knives as previously described.

From the foregoing, it will be noted that at each complete cycle of a forward and rear stroke the device slots the vegetable alternately in two directions and cuts off a layer of cubes, the plunger pawl 63 revolving the ring 61 and guide plate 46 one quarter revolution on each return stroke while the holding lever pawl 64 prevents movement of the plate as pawl 63 overrides the lugs 62, etc., on the cutting strokes. The plate 66 holds the potato clear of the knives on the return stroke and prevents injury to the operator when the remaining uncut vegetable becomes small. The use of the incline 60 makes it unnecessary for the operator to retract the vegetable during the return stroke, his only action being to press the potato into the opening 49 and to reciprocate the carriage 55 by means of the latter's handle 69.

The face of the plate 66 may be slightly roughened near its front edge to prevent its being prematurely withdrawn from in front of the potato due to friction in its guides in carriage 55.

By removing the wing nut 45 the plate 46 and attached parts, also the carriage 55 may be removed from the frame 38 for cleaning.

Although the invention has been disclosed in connection with the specific details of preferred embodiments thereof, it must be understood that such details are not intended to be limitative of the invention except in so far as set forth in the accompanying claims.

What is claimed is:

1. A vegetable cutter comprising a supporting frame having a hopper mounted thereon, said hopper having a side provided with slots therein, a drum rotatably supported on said frame and having an outer spiral surface positioned below said hopper, two sets of slotting knives extending from the surface of said drum one of said sets being so positioned thereon as to pass through the slots into the side of said hopper, and a cutting knife carried by said drum and positioned above the surface thereof and located between said sets of cutting knives.

2. In a vegetable cutter a base, a pivoted frame secured thereto, a vegetable support secured to said base, and two sets of oppositely disposed slitting knives carried on said frame, one of said sets of slitting knives having a greater radius relative to said pivot than the radius of the other set of slitting knives, and a cutting knife carried on said frame and located between said sets of slotting knives, and having its cutting edge facing the set having the less radius.

3. In a vegetable cutter, a frame, a vegetable holder rotatably mounted in the side thereof, a reciprocable carriage slidably mounted in said frame along the side thereof opposite said holder, a plurality of slotting knives and a cutting knife carried on said carriage, and means partly on said holder and partly on said carriage for revolving said holder to turn said vegetable to be slotted in opposite directions by said slotting knives and the slotted portion of said vegetable to be cut therefrom by said cutting knife.

4. In a vegetable cutter, a frame, a vegetable holder rotatably mounted in the side thereof, a carriage adapted to reciprocate in said frame along the side thereof opposite said holder, a plurality of slotting knives and a cutting knife carried on said carriage, a plunger pawl on said carriage, means projecting from said holder adapted to be engaged by said pawl when said carriage is reciprocated in said frame to rotate said holder, and means on said frame to lock said holder in cutting position during the stroke of said knives over the end of the vegetable opposed thereto to slot the same and to cut said slotted portion therefrom.

5. In a vegetable cutter, a frame, a holder rotatably mounted thereon, spring means carried by said holder for holding a vegetable therein, a carriage supported on said frame and having two sets of slotting knives secured thereto, said carriage adapted to be moved past said holder to bring said knives into engagement with the vegetable held thereby, and means operated by the movement of said carriage for rotating said holder whereby each of said sets of slotting knives may slot the surface of a vegetable held in said holder in two directions.

6. In a vegetable cutter, a frame, a holder rotatably mounted thereon, spring means carried by said holder for holding a vegetable therein, a carriage supported on said frame and having two sets of slotting knives secured thereto, means including a handle projecting from said carriage whereby the latter may be moved past said holder to bring said knives into engagement with the vegetable held thereby, and means including a hinged cross member secured to said frame and adapted normally to hold said holder therein whereby said holder and spring means may be removed from said frame while said carriage remains in place thereon.

7. In a vegetable cutter, a frame, and a carriage frame supported thereby, two rows of slotting knives secured to said carriage, a cutting knife positioned between said rows of knives and having its cutting edge disposed in line with the upper edge of one of said sets of slotting knives, the other of said sets of knives projecting above the plane of said cutting knife, a plate having an opening adjacent said cutting knife for the discharge of material cut thereby and a member forming an incline behind one of said rows of slotting knives and forming a surface above the plane of all said knives.

8. In a vegetable cutter, a rectangular supporting frame comprising two spaced parallel plates having offset parallel plane surfaces at one side thereof, a set of spaced slitting knives projecting from each of said surfaces transversely of said frame, and a slicing blade mounted on one of said plates substantially parallel to the other of said plates and having its cutting edge facing the slitting knives on the other plate and lying in a plane substantially intersecting their extremities and lying between said sets of slitting knives.

9. In a vegetable cutter, a rectangular supporting frame comprising two spaced parallel plates having offset parallel plane surfaces at one side thereof, the space between said plates forming a transverse opening, spaced slitting knives projecting from said surfaces transversely of said frame and adjacent said opening, and a slicing blade mounted on one of said plates substantially parallel to the other of said plates and having its cutting edge facing the slitting knives on the other plates and lying in a plane substantially intersecting their extremities and overlying said opening.

10. In a vegetable cutter, a frame, a rectangular knife carrier comprising two spaced parallel plates lying in offset parallel planes relative to each other and having an opening formed therebetween, a group of spaced slitting knives projecting from one of said plates, a group of spaced slitting knives projecting from the other of said plates on the corresponding side thereof, said slitting knives being parallel to each other and lying in said planes, a slicing blade mounted on one of said plates substantially parallel thereto and overlying said opening and having its cutting edge facing the slitting knives on the other plate and lying in a plane substantially intersecting their extremities, and a vegetable holder on said frame, said holder being positionable on said frame relative to said knives.

KUNO W. MESTERTON.